(12) United States Patent
McKay et al.

(10) Patent No.: US 10,597,588 B2
(45) Date of Patent: Mar. 24, 2020

(54) PROCESS AND SYSTEM TO SEPARATE DILUENT

(71) Applicant: FCCL Partnership, Calgary (CA)

(72) Inventors: Michael Patrick McKay, Calgary (CA); Suchang Ren, Calgary (CA); Mayamin Binti Mohd Razali, Manchester (GB); Gyorgy Szekely, Manchester (GB)

(73) Assignee: FCCL Partnership, Calgary (CA)

(*) Notice: Subject to any disclaimer, the term of this patent is extended or adjusted under 35 U.S.C. 154(b) by 177 days.

(21) Appl. No.: 15/795,072

(22) Filed: Oct. 26, 2017

(65) Prior Publication Data

US 2018/0119030 A1    May 3, 2018

Related U.S. Application Data

(60) Provisional application No. 62/413,901, filed on Oct. 27, 2016.

(51) Int. Cl.
| | |
|---|---|
| *C10G 31/09* | (2006.01) |
| *C10G 33/04* | (2006.01) |
| *B01D 61/02* | (2006.01) |
| *C10G 33/00* | (2006.01) |
| *C10G 31/11* | (2006.01) |

(Continued)

(52) U.S. Cl.
CPC ........... *C10G 31/09* (2013.01); *B01D 61/027* (2013.01); *C10G 31/08* (2013.01); *C10G 31/11* (2013.01); *C10G 33/00* (2013.01); *C10G 33/04* (2013.01); *C10G 53/02* (2013.01); *B01D 2311/06* (2013.01)

(58) Field of Classification Search
CPC ........ C10G 31/09; C10G 31/08; C10G 33/00; B01D 61/027; B01D 2311/06
See application file for complete search history.

(56) References Cited

U.S. PATENT DOCUMENTS

| | | | |
|---|---|---|---|
| 5,670,051 A | 9/1997 | Pinnau et al. | |
| 6,331,253 B1 | 12/2001 | Schrive et al. | |
| 7,690,514 B2 | 4/2010 | McKeown et al. | |

(Continued)

FOREIGN PATENT DOCUMENTS

| | | |
|---|---|---|
| CA | 1219236 A | 3/1987 |
| CA | 2544452 A1 | 5/2005 |

(Continued)

OTHER PUBLICATIONS

Membrane Processing in Organic Solvents, Robust Separation Technologies, SolSep BV, Jan. 2014, pp. 1-11.

*Primary Examiner* — Randy Boyer
*Assistant Examiner* — Juan C Valencia
(74) *Attorney, Agent, or Firm* — Borden Ladner Gervais LLP; Geoffrey deKleine

(57) ABSTRACT

The present disclosure provides a process and system for treating a feed diluent to produce a retentate product that is enriched in a heavy diluent component. The process includes: applying the feed diluent to a feed side of an organic solvent nanofiltration membrane; causing the light diluent component in the diluent to preferentially pass through the membrane in comparison to the light diluent component in the feed diluent; and producing the retentate product that is enriched in the heavy diluent component in comparison to the heavy diluent component in the feed diluent.

23 Claims, 6 Drawing Sheets

(51) Int. Cl.
*C10G 53/02* (2006.01)
*C10G 31/08* (2006.01)

(56) References Cited

U.S. PATENT DOCUMENTS

| | | |
|---|---|---|
| 7,847,141 B2 | 12/2010 | Briot et al. |
| 8,056,732 B2 | 11/2011 | Mckeown et al. |
| 8,912,288 B2 | 12/2014 | Liu et al. |
| 2010/0126911 A1* | 5/2010 | Chakrabarty .......... C10G 1/045 |
| | | 208/401 |
| 2013/0168315 A1 | 7/2013 | Minier et al. |
| 2014/0190872 A1* | 7/2014 | Dunn .................... B01D 61/14 |
| | | 208/390 |

FOREIGN PATENT DOCUMENTS

| | | |
|---|---|---|
| CA | 2684471 A1 | 10/2008 |
| CA | 2607353 C | 11/2011 |
| CA | 2734447 C | 2/2016 |
| CA | 2704741 C | 5/2017 |
| CA | 2830755 C | 10/2017 |
| WO | 2005113121 A1 | 12/2005 |
| WO | 2016020696 A1 | 2/2016 |

* cited by examiner

PROCESS AND SYSTEM TO SEPARATE DILUENT

FIELD

The present disclosure relates to processes and systems for separating diluent into light and heavy components.

BACKGROUND

The following paragraphs are not an admission that anything discussed in them is prior art or part of the knowledge of persons skilled in the art.

It is common practice to segregate petroleum substances of high viscosity and density into two categories, "heavy crude oil" and "bitumen". For example, some sources define "heavy crude oil" as a petroleum that has a mass density of greater than about 900 kg/m$^3$ and an American Petroleum Institute (API) gravity less than 22°. Bitumen is sometimes described as that portion of petroleum that exists in the semi-solid or solid phase in natural deposits, with a mass density greater than about 1,000 kg/m$^3$ and a viscosity greater than 10,000 centipoise (cP or 10 Pa·s) measured at original temperature in the deposit and atmospheric pressure, on a gas-free basis, and an API gravity less than 10°. Although there is no direct relationship between density and viscosity, an increase in density (i.e. a reduction in API gravity) is generally accompanied by an increase in viscosity. Although these terms are in common use, references to heavy crude oil and bitumen represent categories of convenience, and there is a continuum of properties between heavy crude oil and bitumen. Accordingly, references to heavy crude oil and/or bitumen herein include the continuum of such substances, and do not imply the existence of some fixed and universally recognized boundary between the two substances. In particular, the term "heavy crude oil" includes within its scope all "bitumen" including hydrocarbons that are present in semi-solid or solid form.

Heavy crude oil may be produced from oil sands, for example by recovery using a thermal in-situ recovery process, such as: steam-assisted gravity drainage (SAGD), expanding solvent steam-assisted gravity drainage (ES-SAGD), cyclic steam stimulation (CSS), steamflooding, solvent-assisted cyclic steam stimulation, toe-to-heel air injection (THAI), or a solvent aided process (SAP).

The greater viscosity and density of heavy crude oil, in comparison to light crude oil, presents challenges associated with transportation. A diluent may be added to the heavy crude oil to facilitate its flow through a pipeline, or to facilitate its handling before, during, or after rail transportation. The diluent is a liquid petroleum that is less viscous than the heavy crude oil, and sufficient diluent is added to reduce the viscosity of the diluent-heavy crude oil blend to a level that allows for the diluent-heavy crude oil blend to be transported.

Diluent may be used to enhance oil and water phase separation of a heavy crude oil/water emulsion produced during an oil sands recovery process. During production of the heavy crude oil, diluent that is added to a heavy crude oil/water emulsion may be vaporized and a portion of the vaporized diluent may be subsequently combusted as fuel gas. Combustion of the vaporized diluent represents a cost for heavy oil production.

INTRODUCTION

The following introduction is intended to introduce the reader to this specification but not to define any invention.

One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

It is desirable to reduce the costs associated with using diluent for treatment, transportation, production of heavy crude oil, or a combination thereof.

There are described herein processes and systems for separating diluent into product streams that are enriched in light or heavy components. In a heavy oil production plant operating at a production rate of even 50,000 barrels per day, savings may be achieved by reducing the amount of diluent lost to vaporization and subsequent combustion. Using products that are enriched with heavy diluent components for enhancing oil and water phase separation of a heavy crude oil/water emulsion may result in reduced vaporization and combustion. Using products that are enriched with light diluent components to meet transportation density and/or viscosity requirements may require smaller amounts of added product since the light components provide more density and/or viscosity reduction per unit volume than unseparated diluent.

In one aspect, the present disclosure provides a process for treating a feed diluent that includes a light diluent component and a heavy diluent component. The process increases the relative amount of the heavy diluent component in a retentate product. The process includes applying the feed diluent to a feed side of an organic solvent nanofiltration membrane; causing the light diluent component in the diluent to preferentially pass through the membrane in comparison to the heavy diluent component in the feed diluent; and producing the retentate product that is enriched in the heavy diluent component in comparison to the heavy diluent component in the feed diluent.

The feed diluent may be a mixture of liquid hydrocarbons that, in combination, have a density of less than 800 kg/m$^3$. The feed diluent may include a natural-gas condensate.

The light diluent component may include hydrocarbons with a calculated permeate mole fraction split of greater than or equal to about 50%. The heavy diluent component may include hydrocarbons with a calculated permeate mole fraction split of less than about 50%. The light diluent component may include one or more C3 to C6 alkane or aromatic hydrocarbons.

The organic solvent nanofiltration membrane may be: GMT-NC-1 obtainable from Borsig Membrane Technology GmbH or NF030306 obtainable from SolSep BV.

Causing the light diluent component to preferentially pass through the membrane may include: applying the feed diluent to the feed side of the organic solvent nanofiltration membrane at a flux from about 1,000 L/h/m$^2$ to about 20,000 L/h/m$^2$, with a permeate:retentate volume split ratio of about 1:1, at a pressure of about 30 bar.

The membrane may be conditioned with a membrane conditioning fluid prior to applying the feed diluent to the feed side of the organic solvent filtration membrane. The membrane conditioning fluid may be a non-polar solvent.

In another aspect, the present disclosure provides for a process, which includes treating a feed diluent as previously described to produce a retentate product that is enriched in the heavy diluent component in comparison to the heavy diluent component in the feed diluent, and mixing at least a portion of a permeate product that is enriched in the light diluent component with a heavy crude oil to generate a reduced-viscosity oil.

A sufficient amount of the permeate product may be mixed with the heavy crude oil to result in the reduced-viscosity oil having a viscosity of about 350 cSt, and the process may further include: transporting the reduced-viscosity oil through a pipeline, and optionally separating at least a portion of the permeate product from the reduced-viscosity oil.

A sufficient amount of the permeate product may be mixed with the heavy crude oil to result in the reduced-viscosity oil having a viscosity of between about 350 cSt and about 500,000 cSt, and the process may further include: transporting the reduced-viscosity oil by rail, and optionally separating at least a portion of the permeate product from the reduced-viscosity oil.

The above described processes may further include: mixing at least a portion of the retentate product that is enriched in the heavy diluent component with an emulsion that comprises heavy crude oil and produced water, and separating at least a portion of the heavy crude oil from at least a portion of the produced water. A sufficient amount of the retentate product may be mixed with the emulsion to result in a mixture of about 30% water and about 70% heavy crude oil. The separated heavy crude oil may comprise less than about 0.5% basic sediment and water (BS&W) and the separated produced water comprises less than about 1,000 ppm oil and grease. The process may further include: producing a permeate product that is enriched in the light diluent component in comparison to the light diluent component in the feed diluent, and mixing at least a portion of the permeate product with the separated heavy crude oil to generate a reduced-viscosity oil. A sufficient amount of the permeate product may be mixed with the separated heavy crude oil to result in the reduced-viscosity oil having a viscosity of about 350 cSt, and the process may further include: transporting the reduced-viscosity oil through a pipeline and optionally separating at least a portion of the permeate product from the reduced-viscosity oil. A sufficient amount of the permeate product may be mixed with the separated heavy crude oil to result in the reduced-viscosity oil having a viscosity of between about 350 cSt and about 500,000 cSt, and the process may further include: transporting the reduced-viscosity oil by rail, and optionally separating at least a portion of the permeate product from the reduced-viscosity oil.

In another aspect, the present disclosure provides a system for treating a feed diluent that includes a light diluent component and a heavy diluent component. Treatment with the system increases the relative amount of the heavy diluent component in a retentate product. The system includes: a feed line for the feed diluent and a filtration chamber separated into a retentate side and a permeate side by an organic solvent nanofiltration membrane positioned within the filtration chamber. The filtration chamber is in fluid communication with the feed line, and the feed diluent is provided to the retentate side of the filtration chamber. The organic solvent nanofiltration membrane preferentially retains the heavy diluent component and produces the retentate product that is enriched in the heavy diluent component in comparison to the heavy diluent component in the feed diluent.

BRIEF DESCRIPTION OF THE DRAWINGS

Embodiments of the present disclosure will now be described, by way of example only, with reference to the attached Figures.

DETAILED DESCRIPTION

Figure 1:
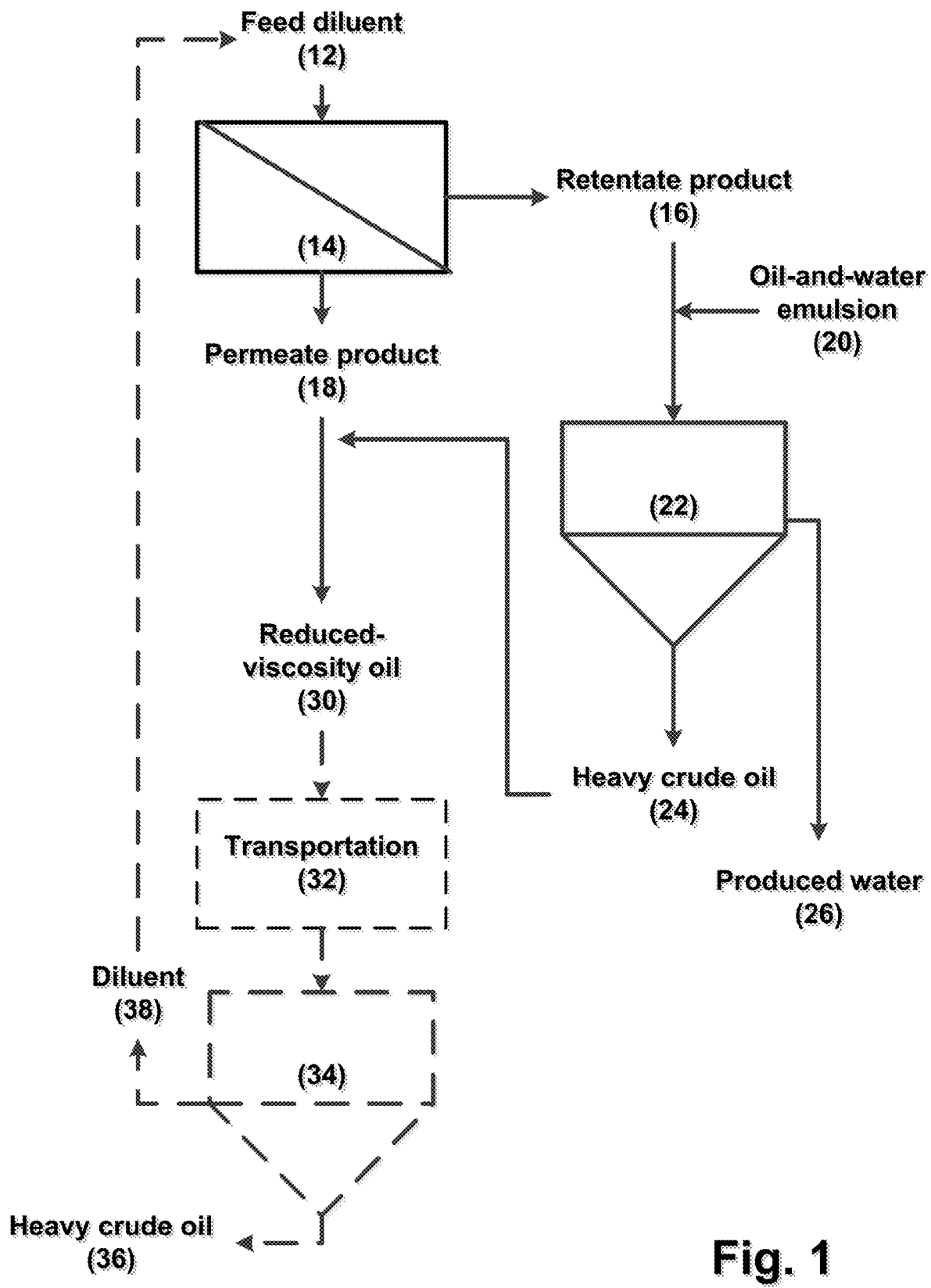
FIG. 1 is a schematic illustrating an exemplary process according to the present disclosure.

Generally, the present disclosure provides a process and system for treating a feed diluent to produce a retentate product that is enriched in a heavy diluent component, in comparison to the relative amount of heavy diluent component in the feed diluent.

The feed diluent includes a light diluent component and a heavy diluent component. The process increases the relative amount of the heavy diluent component in the retentate product in comparison to the relative amount of the heavy diluent component in the feed diluent. The process includes: applying the feed diluent to a feed side of an organic solvent nanofiltration membrane; causing the light diluent component in the feed diluent to preferentially pass through the membrane in comparison to the heavy diluent component in the feed diluent; and producing the retentate product that is enriched in the heavy diluent component in comparison to the heavy diluent component in the feed diluent.

In the context of the present disclosure, "diluent", "feed diluent", "diluent feed", "bitumen diluent", "bitumen diluent feed", "heavy crude oil diluent", "heavy crude oil diluent feed", and "diluent for bitumen", all refer to a liquid hydrocarbon capable of being used to dilute a heavy crude oil for transportation, enhance the separation of a heavy crude oil/water emulsion, or both. The diluent includes a light diluent component and a heavy diluent component. The diluent may be, for example, an oil sands condensate; a natural-gas condensate; a synthetic hydrocarbon blend; naphtha; a mixture that includes at least one C3-C10 hydrocarbon, that is at least one hydrocarbon having from three to ten carbon atoms, and at least one hydrocarbon having at least 11 carbon atoms (carbons); or a mixture that includes at least one C3-C11 hydrocarbon and at least one hydrocarbon having at least 12 carbon atoms.

The hydrocarbons present in the light diluent and the heavy diluent may vary depending on, for example, the diluent type, the membrane type, and the operating conditions of the filtration. In some examples, the hydrocarbons present in the light diluent and the heavy diluent may be determined by reference to the number of carbons in the hydrocarbon. The light diluent component may include one or more C3-C10 hydrocarbons, or one or more C3-C11 hydrocarbons. In the C3-C10 hydrocarbon examples according to the present disclosure, the C3-C10 hydrocarbons are C3-C10 alkanes, C3-C10 alkenes, C3-C10 aromatics, C3-C10 isomers thereof, or a combination thereof. In the C3-C11 hydrocarbon examples according to the present disclosure, the C3-C11 hydrocarbons are C3-C11 alkanes, C3-C11 alkenes, C3-C11 aromatics, C3-C11 isomers thereof, or a combination thereof. In some examples, the light diluent component may include one or more C3-C6 alkane hydrocarbons. The heavy diluent component may include one or more hydrocarbons having at least 11 carbons, or one or more hydrocarbons having at least 12 carbons. In some examples, the heavy diluent component may include one or more C11-C30 alkane hydrocarbons, or one or more C12-C30 alkane hydrocarbons. In the C11-C30 hydrocarbon examples according to the present disclosure, the C11-C30 hydrocarbons are C11-C30 alkanes, C11-C30 alkenes, C11-C30 aromatics, C11-C30 isomers thereof, or a combination thereof. In the C12-C30 hydrocarbon examples, the C12-C30 hydrocarbons are C12-C30 alkanes, C12-C30 alkenes, C12-C30 aromatics, C12-C30 isomers thereof, or a combination thereof. In further examples, the light diluent component may include one or more C3-C6 alkane hydrocarbons and the heavy diluent may include one or more C11-C30 alkane hydrocarbons. In further examples, the light diluent component may include one or more C3-C6 alkane hydrocarbons and the heavy diluent may include one or more C12-C30 alkane hydrocarbons. In some examples, the feed diluent comprises small quantities of alkenes in comparison to the amount of alkanes in the feed diluent.

The hydrocarbons present in the light diluent and the heavy diluent may be determined by reference to mole fraction. The relative amount of a component in a mixture refers to the mole fraction of the component. The mole fraction may be expressed as a percentage. That is, treating a feed mixture to increase the relative amount of a component means that the resulting product has a greater fraction of moles of the component to total moles in the product compared to the mole fraction of the component in the feed mixture.

In some examples, the hydrocarbons present in the light diluent and the heavy diluent may be determined by reference to calculated permeate mole fraction split. A permeate mole fraction split of three or more C3-C30 hydrocarbons may be calculated after a feed diluent is treated by a process or system according to the present disclosure, and plotted against the three or more C3-C30 hydrocarbons in series according to increasing size. The heavy diluent component includes the one or more hydrocarbons that fall along a calculated downward trend in permeate mole fraction splits and the larger hydrocarbons following the downward trend. The light diluent component includes the one or more hydrocarbons preceding the downward trend. In the context of the present disclosure, the downward trend is a series of hydrocarbons each subsequently larger in size than the previous hydrocarbon in series, and each subsequently having a decreasing calculated permeate mole fraction splits. In some examples, the calculated permeate mole fraction splits of three or more C3-C30 hydrocarbons may be plotted against the C3-C30 hydrocarbons in series according to increasing number of carbon atoms. The downward trend may be indicated by a negative slope value.

In yet other examples, the hydrocarbons present in the light diluent and the heavy diluent may be determined by reference to calculated permeate mole fraction split percentage. The heavy diluent component may include one or more hydrocarbons with a calculated permeate mole fraction split of less than about 50% and the light diluent component may include one or more hydrocarbons with a calculated permeate mole fraction split of greater than or equal to about 50%. In some examples, the diluent may be a mixture of liquid hydrocarbons that, in combination, have a density of less than 800 kg/m$^3$.

In the context of the present disclosure, "larger hydrocarbons" refers to hydrocarbons having a greater number of carbon atoms.

In the context of the present disclosure, it should be understood that the organic solvent nanofiltration membrane allows a portion of both the light and the heavy diluent components to pass through (resulting in the permeate product), while also preventing a portion of both the light and the heavy diluent components from passing through (resulting in the retentate product). Preferentially allowing a light diluent component to pass through the membrane in comparison to a heavy diluent component refers to the membrane allowing more of the light diluent component than the heavy diluent component to pass through than would be expected only on the basis of their relative amounts in the feed diluent. That is, both the permeate product and the retentate product may have light and heavy diluent components, but the relative amount of heavy diluent components will be greater in the retentate product than in the feed diluent.

Processes according to the present disclosure may include adjusting one or more of the following parameters: pressure, flow rate, nanofiltration membrane type, nanofiltration membrane area, number of nanofiltration membranes arranged in series or parallel, temperature, and tangential velocity. In the context of the present disclosure, temperature may refer to feed diluent temperature, membrane temperature, or any other temperature of the presently disclosed processes and systems. Exemplary processes of the present disclosure condition the membrane before separation with a membrane conditioning fluid, for example, a non-polar solvent such as hexane, heptane, toluene, diluent or a mixture thereof. The membrane may be conditioned for about 12 hours. In some examples, the membrane conditioning may occur over shorter or longer periods. In some examples according to the present disclosure, the membrane conditioning flow rates and pressures may be within about ±10% of the feed diluent separation flow rates and pressures. The membrane conditioning may occur before the feed diluent separation process such that the flow rates and pressures need not be changed when the feed is changed from the membrane conditioning fluid to the feed diluent. Different conditioning flow rates, pressures or timing may have different effects on the feed diluent separation. Without being limited to theory, performance of the membrane for separation may change as a result of conditioning effects, for example, membrane compaction, partial adsorption of the membrane conditioning fluid to the membrane, and polymer chain rearrangement in the membrane. In some examples according to the present disclosure, these effects may also occur during the feed diluent separation.

The organic solvent nanofiltration membrane may be in a cross-flow membrane filtration cell. A plurality of membranes may be used in a plurality of filtration cells. The membrane may be subjected to a flow rate sufficient to result in a trans membrane pressure from about 10 bar to about 30 bar. The inlet and outlet pressures of the membrane filtration cell may be adjusted to regulate the trans membrane pressure. Outside this range, the separation of diluent may be inefficient or may unnecessarily increase the cost of the separation process. The membrane may be subjected to a sufficient flow rate, pressure, or a combination thereof, to result in a flux of the permeate product from about 1,000 L/h to about 20,000 L/h per m$^2$ of membrane. In some examples according to the present disclosure, the flow rate is from about 10 m$^3$/hr to about 500 m$^3$/hr.

In some examples, the organic solvent nanofiltration membrane used in processes according to the present disclosure may be configured to have a tight membrane (low molecular weight cut-off) with a sharp cut-off curve, for example, when increasing the precision of separation of the components in the feed diluent is preferable. In some examples, the membrane is conditioned with a membrane conditioning fluid before separation, such as with hexane, heptane, toluene, diluent, or a mixture thereof. The membrane may be conditioned for about 12 hours. In some examples, a larger organic solvent nanofiltration membrane area may be used in processes and systems according to the present disclosure, for example, when decreasing the overall time scale of the process is preferred. In other examples, a smaller organic solvent nanofiltration membrane area may be used in processes and systems according to the present disclosure, for example, when decreasing material costs is preferable.

In some examples, the feed diluent flow rate may be increased, for example when: (1) increasing the efficiency of the separation; (2) decreasing the overall time scale of processes according to the present disclosure; (3) preventing excessive fouling; or (4) any combination thereof, is desirable. In some examples, the pressure subjected on the membrane may be increased, for example, when: (1) decreasing the overall time scale of the process according to the present disclosure; (2) combating a decline in flux; or (3) any combination thereof, is desirable. In some examples according to the present disclosure, the flow rate is from about 10 $m^3$/hr to about 500 $m^3$/hr.

In some examples, the temperature of the flow may be increased, for example, when: (1) increasing the efficiency of the separation; (2) decreasing the overall time scale of processes according to the present disclosure; (3) preventing excessive fouling; or (4) any combination thereof, is desirable. A skilled person would understand that the temperature may be adjusted depending on the specifications of the organic solvent nanofiltration membrane used in processes and systems according to the present disclosure. In some examples according to the present disclosure, the temperature is about the ambient temperature. In some examples, the feed diluent is applied to the feed side of the organic solvent nanofiltration membrane tangential to the membrane surface, for example, to decrease the build-up of retained solutes at the surface. In some of the aforementioned examples, the tangential velocity may be increased, for example when: (1) increasing the efficiency of the separation; (2) decreasing the overall time scale of processes according to the present disclosure; (3) preventing excessive fouling; or (4) any combination thereof, is desirable. The membrane may be subjected to a sufficient flux, flow rate, pressure, or a combination thereof, to result in a permeate: retentate volume split ratio of about 1:2 to about 2:1 (vol:vol). In some examples, the processes according to the present disclosure may operate at a permeate:retentate volume split ratio outside this range.

In some examples, the presently disclosed filtration processes and systems may incorporate a backpulsing procedure, a clean-in-place system, or a combination thereof when preventing excessive membrane fouling is desirable.

Organic solvent nanofiltration membranes that may be used in processes and systems according to the present disclosure allow the light diluent components to preferentially pass through the membrane in comparison to the heavy diluent components. In some examples, the organic nanofiltration membranes are constructed of a cross-linked polymeric material for increasing stability. Polymeric membranes without cross-linking or suitable monomers may be of an insufficient stability. In some examples, the organic solvent nanofiltration membranes have an increased resistance to degradation to one or more solvents, for example, veggy oil, ketones, crude alkanes, acetone, ethanol, methanol, isopropyl alcohol, hexane, petroleum ether, ethylacetate, methyl ethyl ketone, methylbenzol, and methylchloride. In some preferred examples, the organic solvent nanofiltration membranes have an increased resistance to degradation to oil, for example, liquids comprising at least one C3-C10 hydrocarbon and at least one hydrocarbon having at least 11 carbons. In some examples, the organic solvent nanofiltration membranes are configured to: (1) facilitate high permeate flux; (2) facilitate high feed diluent flow rate; (3) facilitate high pressure subjected on the membrane; (4) facilitate high temperature of the flow; (5) facilitate high tangential velocity of the flow; (6) reduce membrane fouling; (7) reduce hydrocarbon degradation; or (8) any combination thereof.

The organic solvent nanofiltration membrane may be, for example: GMT-NC-1 (now called GMT-oNF-3) obtainable from Borsig Membrane Technology GmbH, or NF030306 obtainable from SolSep BV. As shown in the examples, below, using a GMT-NC-1 or NF030306 membrane in a membrane separation process according to the present disclosure produced a retentate enriched in one or more heavy diluent components. In contrast, using a Novamem 1, Novamem 2, GMT-oNF-1, GMT-oNF-2, or NF010306 membrane did not provide a retentate sufficiently enriched in a heavy diluent component to appreciably reduce the costs associated with using the diluent product for production of heavy crude oil. Novamem 1 and 2 membranes are obtainable from Novamem Ltd, GMT-oNF-1 and -2 membranes are obtainable from Borsig Membrane Technology GmbH, and NF010306 membrane is obtainable from SolSep BV. Novamem 1 and 2 membranes are polyether ether ketone (PEEK) membranes with a non-porous coating, and have 1,000 nm pores. GMT-oNF-1 and -2 membranes are silicone polymer-based composite membranes. GMT-NC-1, NF010306 and NF030306 membranes are silicone type membranes. NF010306 and NF030306 membranes may be thin film composite (TFC) membranes possessing a silicone top layer.

A portion of the retentate product may be mixed with an emulsion that includes heavy crude oil and produced water to enhance separation of the heavy crude oil from the produced water. At least a portion of the heavy crude oil may be separated from at least a portion of the produced water. In some examples, a sufficient amount of the retentate product is mixed with the emulsion to result in a mixture of about 30% water, about 70% heavy crude oil, and about <0.5% basic sediment and water (BS&W). In some examples, upon separation of the mixture by way of a free water knockout (FWKO) vessel, a treater, or both a FWKO and a treater, the separated heavy crude oil may contain <0.5% BS&W and the separated produced water may contain <1,000 ppm oil and grease. A person of skill in the art will understand that a variety of other processes may be undertaken in combination with those described herein to enhance emulsion separation, for example, by using chemical additives or electrostatic technology.

In the context of the present disclosure, enhancing separation of the heavy crude oil from the produced water by mixing the emulsion with the retentate product is in comparison to separation without mixing the retentate product with the emulsion. Enhancing separation may refer to: increasing the amount of heavy crude oil produced, increasing the purity of the heavy crude oil produced, reducing the density of the heavy crude oil produced, reducing the time associated with the oil/water separation, or any combination thereof.

As discussed above, treating a feed diluent according to the present disclosure increases the relative amount of the heavy diluent component in the retentate product in comparison to the relative amount of the heavy diluent component in the feed diluent. In some exemplary processes, as the heavy diluent component is preferentially retained in the retentate, the light diluent component passes through the organic solvent nanofiltration membrane and results in a permeate product that is enriched in the light diluent component in comparison to the light diluent component in the feed diluent. Processes according to the present disclosure may recycle a portion of the permeate product to the feed stream, which may increase enrichment of the light diluent component in the final permeate product in comparison to a single pass-through process where no permeate product is recycled to the feed stream.

A portion of the permeate product enriched with the light diluent component, produced according to the present disclosure, may be mixed with a heavy crude oil to generate a reduced-viscosity oil. The reduced-viscosity oil may be transported, for example through a transport pipeline or by rail. The transported reduced-viscosity oil may be separated after transportation to regenerate at least a portion of the permeate product, which may be mixed with additional heavy crude oil to generate additional reduced-viscosity oil.

Generating a reduced-viscosity oil for transport though a transport pipeline may include mixing a sufficient amount of the permeate product with the heavy crude oil to generate a reduced-viscosity oil having a viscosity of about 350 cSt. In some examples, the reduced-viscosity oil has a viscosity of about 350 cSt at a pipeline reference temperature between about 8° C. and about 19° C., which is the temperature of the ground surrounding the pipeline. Generating a reduced-viscosity oil for transport by rail may include mixing a sufficient amount of the permeate product with the heavy crude oil to generate a reduced-viscosity oil having a viscosity between about 350 cSt and the viscosity of bitumen, for example, about 500,000 cSt, or up to about 1,000,000 cSt or higher, depending on the rail transportation temperature of the reduced-viscosity oil.

When the heavy crude oil is bitumen, a diluent-bitumen blend formulated for pipeline transportation may be referred to as "dilbit"; and a diluent-bitumen blend formulated for rail transportation may be referred to as "railbit". Dilbit may have a diluent:bitumen ratio of about 30:70 to about 40:60. Railbit may have a diluent:bitumen ratio of about 12:88 to about 40:60. When the diluent being used is a permeate product enriched with the light diluent component, these ratios may be changed to include less diluent while still achieving the desired physical properties for transportation, such as the desired viscosities.

Processes according to the present disclosure may include, as discussed herein, treating the feed diluent to generate a retentate product enriched in the heavy diluent component and a permeate product enriched in the light diluent component; mixing at least a portion of the retentate product with an emulsion that includes heavy crude oil and produced water to enhance separation of the heavy crude oil from the produced water; and mixing at least a portion of the permeate product with the separated heavy crude oil to generate a reduced-viscosity oil. The reduced-viscosity oil may have the same characteristics as the reduced-viscosity oil discussed above and may be further handled in a manner as discussed above, such as being transported through a transport pipeline or by rail.

Systems according to the present disclosure include a feed line for the feed diluent; and a filtration chamber separated into a retentate side and a permeate side by an organic solvent nanofiltration membrane positioned within the filtration chamber. The filtration chamber is in fluid communication with the feed line and the diluent is provided to the retentate side of the filtration chamber. The organic solvent nanofiltration membrane preferentially retains the heavy diluent component and produces the retentate product that is enriched in the heavy diluent component in comparison to the heavy diluent component in the diluent feed. Systems according to the present disclosure may include adjusting one or more of the following parameters: feed diluent, flux, flow rate, pressure, nanofiltration membrane type, nanofiltration membrane area, number of nanofiltration membranes arranged in series or parallel, temperature, tangential velocity, timing, and membrane conditioning. In some examples, the feed diluent flow rate, the pressure subjected on the membrane, the type of nanofiltration membrane, the size of the nanofiltration membrane, the temperature of the flow, and the tangential velocity may be adjusted as previously described in the context of adjusting one or more parameters of the processes according to the present disclosure. In some examples, the membrane conditioning fluid(s) used for conditioning the membrane, the tangential velocity of the conditioning, or a combination thereof, may be adjusted as previously described in the context of adjusting one or more parameters of the processes according to the present disclosure.

One specific example of a process according to the present disclosure is illustrated in FIG. 1. In the exemplary process illustrated in FIG. 1, a feed diluent (12) is treated in an organic solvent nanofiltration-based separation system (14). The separation system (14) produces a retentate product (16) and a permeate product (18). The retentate product (16) is enriched in a heavy diluent component in comparison to the relative amount of the heavy diluent component in the feed diluent (12). At least a portion of the retentate product (16) is mixed with an oil-and-water emulsion (20), such as an emulsion produced using a thermal in-situ recovery process. The resulting mixture is separated in a separator (22), which produces a heavy crude oil (24) and a produced water (26).

The permeate product (18) produced by the separation system (14) is enriched in a light diluent component. At least a portion of the heavy crude oil (24) is mixed with at least a portion of the permeate product (18), for example, by way of turbulent flow or an optional mixer. The amounts of heavy crude oil (24) and permeate product (18) are chosen so that a resulting reduced-viscosity oil (30) has a viscosity that allows the oil (30) to be transported.

Additional optional steps are shown in stippled lines. The reduced-viscosity oil (30) may be transported (32), for example by pipeline or rail. The reduced-viscosity oil (30) may be treated in a separator (34) to regenerate a heavy crude oil (36) and at least some diluent (38). The diluent (38) may be reused alone or by mixing it with the feed diluent (12) for further processing.

Figure 6:
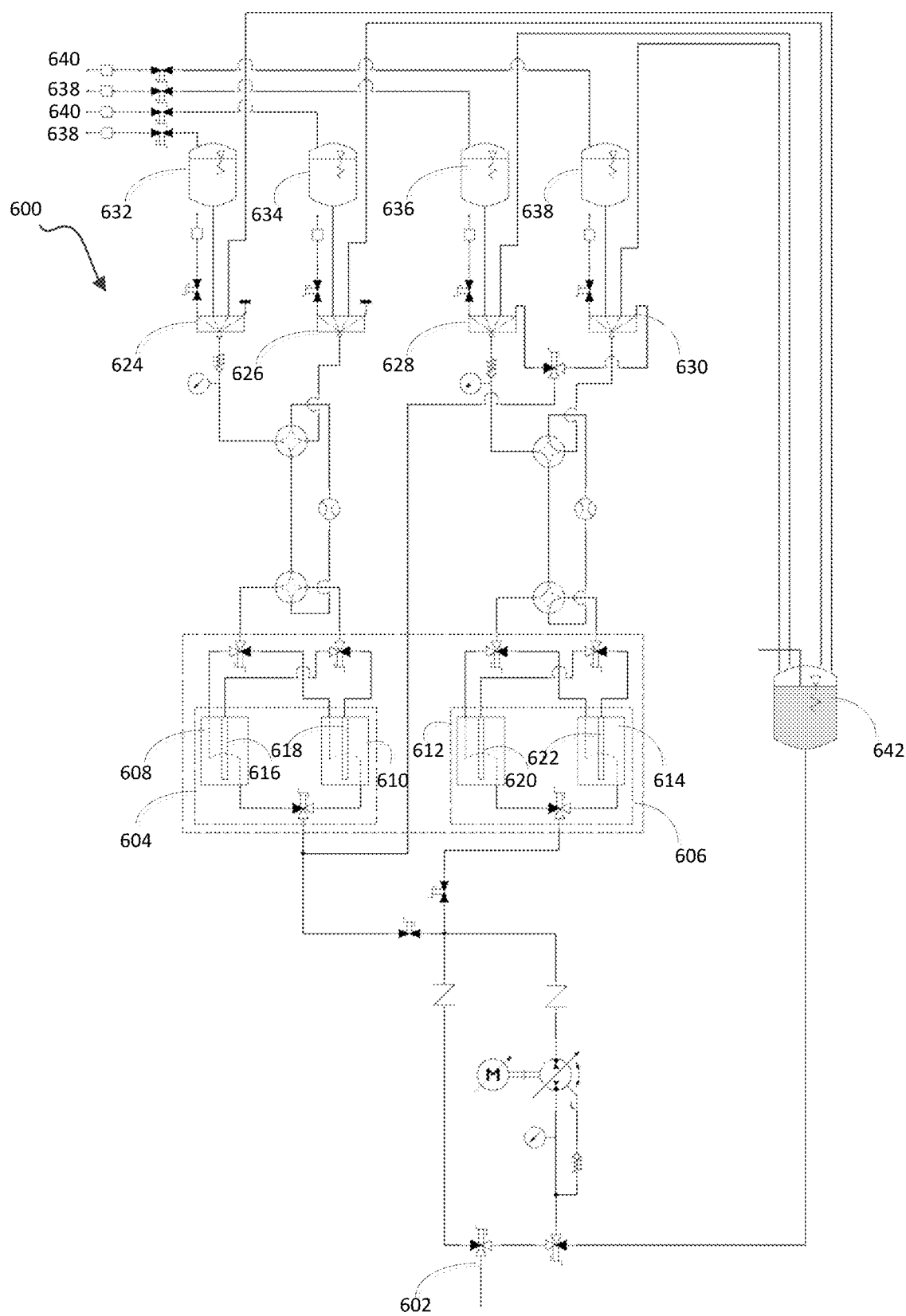
FIG. 6 is a flow diagram illustrating a test skid using an exemplary process according to the present disclosure.

Processes according to the present disclosure may be used in operations of varying scale, for example, test skid operations and commercial scale operations. In one example, FIG. 6 shows a flow diagram of an exemplary test skid (600). Generally, the feed diluent enters from piping (602). The feed diluent can then enter membrane unit 1 (604), membrane unit 2 (606), or a combination thereof through a network of piping and flow control valves. Membrane unit 1 (604) and membrane unit 2 (606) each comprise two membrane cells: membrane unit 1 (604) comprises membrane cell 1 (608) and membrane cell 2 (610); and membrane unit 2 (606) comprises membrane cell 3 (612) and membrane cell 4 (614). Each membrane cell comprises one membrane: membrane cell 1 (608) comprises membrane 1 (616); membrane cell 2 (610) comprises membrane 2 (618); membrane cell 3 (612) comprises membrane 3 (620); and membrane cell 4 (614) comprises membrane 4 (622). Each of the four membranes is either a GMT-NC-1 or a NF030306 membrane. The diluent feed may enter up to all four of the membrane cells (608, 610, 612, and 614) simultaneously through a network of piping and flow control valves. The permeate (shown passing through the cells (608, 610, 612, and 614) and retentate are then recovered from the cells (608, 610, 612, and 614). The combined permeate and, separately, combined retentate streams make their way to four sampling points: permeate sample point 1 (624); retentate sample point 1 (626); permeate sample point 2 (628); and retentate sample point 2 (630), through a network of piping and flow control valves. From the four sample points, the combined permeate and the combined retentate streams may be sent to four fluid tanks: permeate fluid tank 1 (632); retentate fluid tank 1 (634); permeate fluid tank 2 (636); and retentate fluid tank 2 (638), from which the permeate and retentate can be sent on for use in sales oil viscosity reduction (638) and emulsion treatment (640), respectively, through a network of piping and flow control valves. From the four sample points, the combined permeate and combined retentate steams may also be routed to a 5th fluid tank (642) and back into the testing process, through a network of piping and flow control valves.

In some test skid examples, the number of: (1) membrane units; (2) membrane cells; (3) membranes; (4) sample points; and (5) fluid tanks may vary depending on, for example, (1) the amount of feed diluent; (2) the process conditions; or (3) a combination thereof. In some test skid examples, the membrane cells or membrane units are arranged in series to enable the permeate or retentate stream to pass through more than one membrane cell or membrane unit when, for example, the operating parameters for a particular operation for oil viscosity reduction, emulsion treatment, or combination thereof require such an arrangement.

In some test skid examples, the process configurations comprise conditioning, cascades, continuous, batch, single membrane, and mixed membrane operations. In some examples, the configurations are performed manually. In other examples, the configurations are automated.

In some test skid examples, the membranes are operated at pressures from about 500 kPa to about 5000 kPa, at temperatures at about ambient temperature, and the diluent is provided at a flow rate from about 10 m³/hr to about 500 m³/hr. In some examples of the above-described test skid, the membranes are subjected to a flow rate sufficient to result in a trans membrane pressure of about 20 bar. The inlet and outlet pressures may be adjusted to achieve such a trans membrane pressure.

EXAMPLES

Example 1: 2 L and 12.5 L Test Processes

Seven organic solvent nanofiltration membranes were evaluated for their ability to separate a feed diluent into permeate and retentate products enriched in light and heavy diluent components, respectively. The organic solvent nanofiltration membranes were Novamem 1 and Novamem 2, obtainable from Novamem Ltd.; GMT-oNF-1, GMT-oNF-2, and GMT-NC-1 obtainable from Borsig Membrane Technology GmbH; and NF010306 and NF030306 obtainable from SolSep BV.

Figure 2:
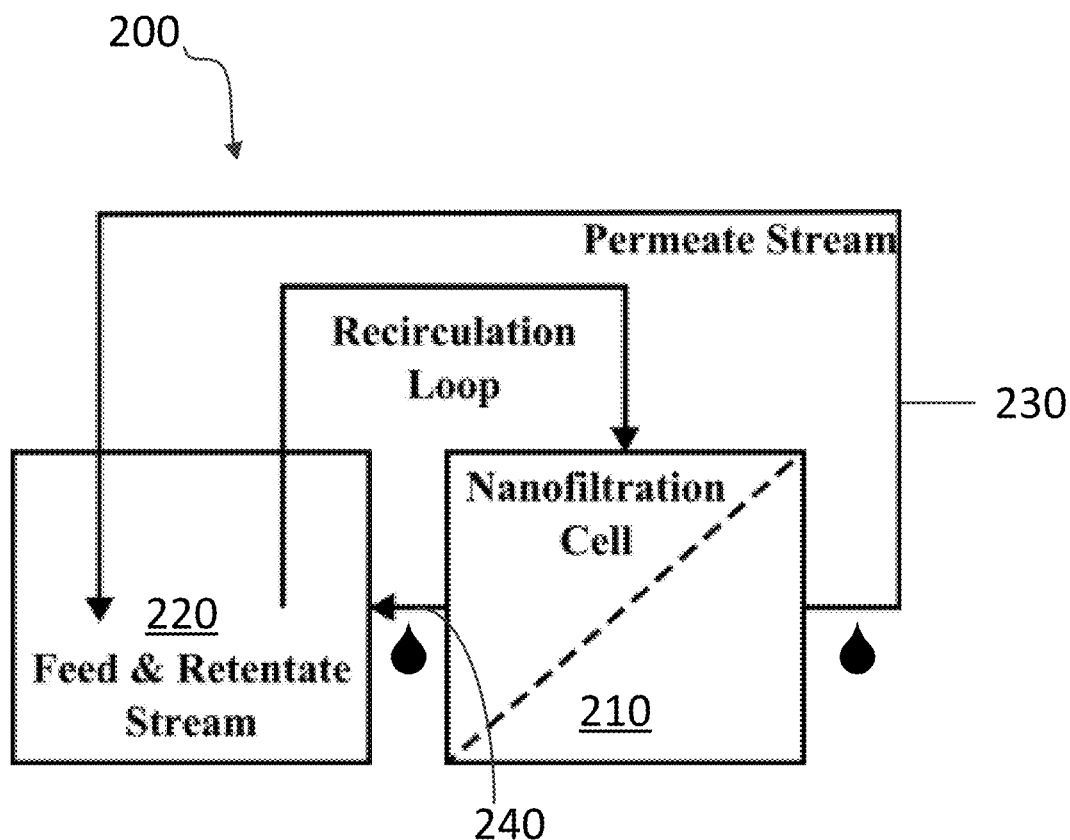
FIG. 2 is a schematic illustrating a process for membrane screening, with sampling points noted with a droplet symbol.

The nanofiltration membranes were first screened using a screening process configuration (200) shown in FIG. 2 to evaluate the diluent split capabilities. The nanofiltration membranes, each having a 53 cm² surface area, were loaded into a cross-flow membrane cell (210). The flow rate of the feed pump and the cross-flow recirculation pump were set at 3-6 L/h and 100 L/h, respectively. The pressure was kept constant at 10, 20 or 30 bar using a back pressure regulator. The nanofiltration membranes were washed (2 mL/cm²) and conditioned (12 h) with either hexane or the feed diluent. In the screening process, a feed diluent (220) was applied to each of the membranes and the resulting permeate (230) and retentate (240) streams were returned to the feed diluent (220). The flowrate of the permeate was measured at different pressures. The measured permeate flowrates at 10 bar for GMT-oNF-2, GMT-oNF-1, NF030306, GMT-NC-1 and NF010306 were 0.047±0.01, 0.05±0.02, 0.007±0.01, 0.219±0.38, and 0.008±0.02 L/h, respectively. The measured permeate flowrates at 20 bar for GMT-oNF-2, GMT-oNF-1, NF030306, GMT-NC-1 and NF010306 were 0.091±0.05, 0.094±0.05, 0.011±0.01, 0.28±0.40, and 0.015±0.03 L/h, respectively. The measured permeate flowrates at 30 bar for GMT-oNF-2, GMT-oNF-1, NF030306, GMT-NC-1 and NF010306 were 0.139±0.05, 0.151±0.05, 0.019±0.02, 0.387±0.16, and 0.009±0.01 L/h, respectively.

Figure 3:
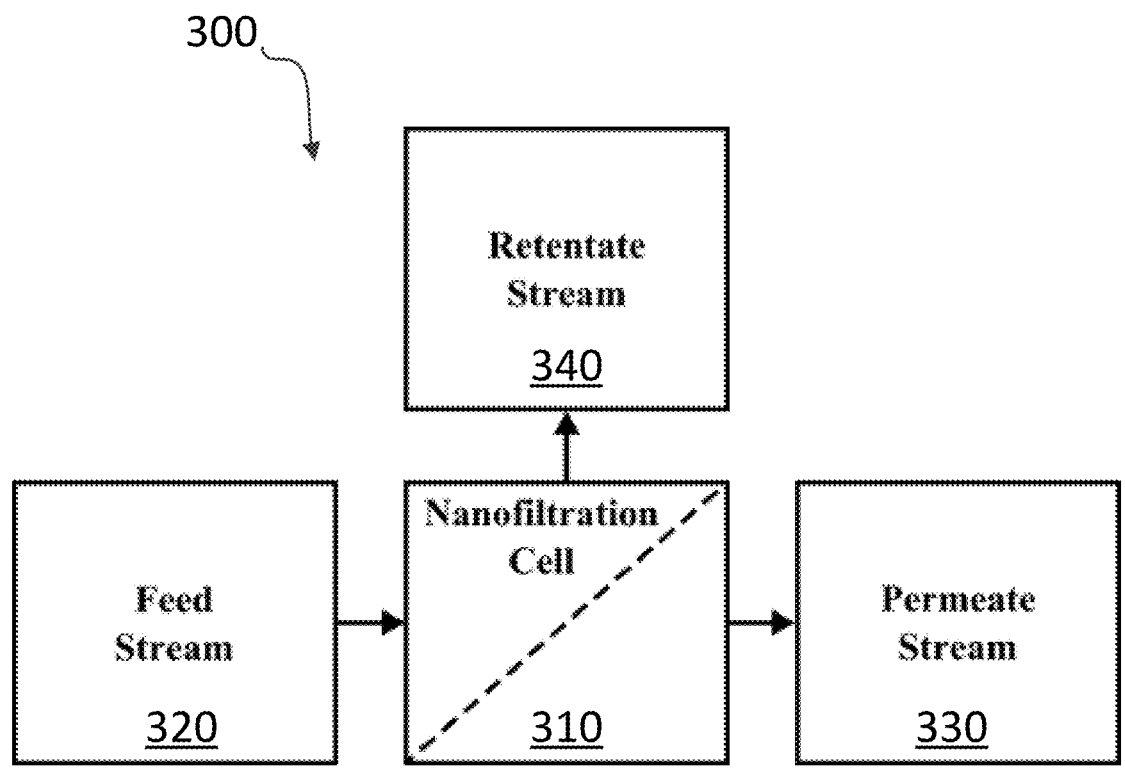
FIG. 3 is a schematic illustrating a process for testing a membrane for diluent separation.

Once steady-state was reached under the given conditions, samples were taken from the retentate/feed and permeate streams (noted by a droplet symbol in FIG. 2) and evaluated to determine the diluent split capability of the membranes under the above noted conditions, but at 30 bar to achieve the highest flux. The Novamem 1, Novamem 2, GMT-oNF-1, and GMT-oNF-2 membranes demonstrated little to no separation between light and heavy hydrocarbons in the feed, permeate and retentate streams, indicating that there was insufficient separation of light and heavy hydrocarbons by the membranes. The GMT-NC-1, NF010306, and NF030306 demonstrated some separation between light and heavy hydrocarbons in the feed, permeate and retentate streams. However, the NF010306 membrane did not demonstrate sufficient separation between light and heavy hydrocarbons to appreciably reduce the costs associated with using the diluent product for production of heavy crude oil. Permeate:retentate volume split ratios between 0.5:1 and 2:1 were established using the GMT-NC-1 membrane by varying the flowrate of the feed pump. A permeate:retentate volume split ratio of about 0.11:1 was established using the NF030306 membrane, which produced a permeate flow rate of about 0.004 L/h. The permeate:retentate volume split ratio and flux of NF030306 were not sufficient to appreciably reduce the costs associated with using the diluent product for production of heavy crude oil, and therefore, only the GMT-NC-1 membrane was evaluated to determine the diluent split capability using a once-through processing configuration (300) as shown in FIG. 3.

In the once-through processing test, the GMT-NC-1 membrane, having a 53 cm² surface area, was loaded into a cross-flow membrane cell (310). The flow rate of the feed pump was set at about 1.2 L/h, with a permeate:retentate volume split ratio of about 1:1. The pressure was kept constant at 30 bar using a back pressure regulator. The GMT-NC-1 membrane was washed (2 mL/cm$^2$) and conditioned (12 h) with either hexane or the feed diluent. Two tests were performed with 2 L of feed diluent, the tests lasting about 2 h; and one test was performed with 12.5 L of feed diluent, the test lasting about 10 h. The diluent feed stream (320) was fed onto the GMT-NC-1 membrane, the permeate (330) and retentate (340) streams were collected in different vessels, and the permeate:retentate volume split ratio was investigated.

In the 2 L test, about 886 mL of permeate was collected at a flow rate of about 0.63 L/h and about 874 mL of retentate was collected at a flow rate of about 0.62 L/h and this data is averaged for the first and second 2 L tests. Samples of the permeate and retentate were collected once steady-state had been reached and the samples were analyzed for their mole fraction percent compositions, which are shown in Table 1 (averaged for the first and second 2 L tests).

During these experiments, large volumes of feed diluent were transported between locations for sampling and analyses. During the transport, some light hydrocarbons, for example, but not necessarily limited to C4-C6, were lost due to evaporation and/or shipping conditions. These losses are illustrated in the differences between the "initial feed sample" and the "calculated feed" columns in Table 1. The effect of light hydrocarbon loss would have a small impact on the diluent separation since the light and heavy hydrocarbon component separation is reflected in a ratio of moles of the component in the permeate compared to total moles in the permeate (see "permeate mol frac split" column in Table 1). Due to this light hydrocarbon loss, the "calculated feed" was used for determining the permeate mole fraction split.

Figure 4:
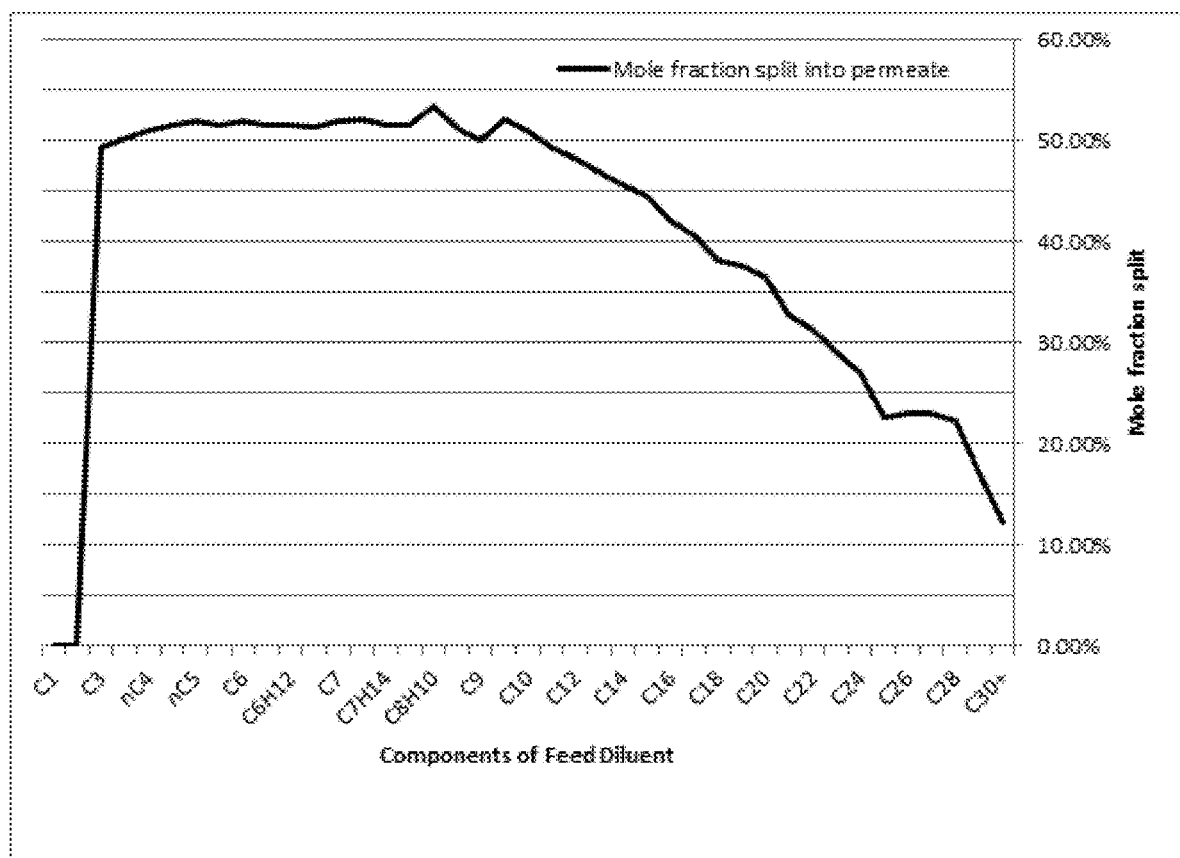
FIG. 4 is a graph illustrating the mole fraction split into the permeate of each of the components in a 2 liter (L) feed diluent in an exemplary process according to the present disclosure.

As shown in Table 1, for C3-C10 hydrocarbon components, the permeate mole fraction split varied between about 49% and about 54%. From hydrocarbon C11 to larger hydrocarbons, the permeate mole fraction split decreased from about 49%, which signified that there were less heavy hydrocarbon components (C11+) permeated (see also FIG. 4, which is a graphical representation of the permeate mole fraction split of each of the components in the feed diluent). The heavier the C11+ component, the lower the split ratio, thus more heavy components end up in the retentate stream. As a result, the density of the permeate samples was lower (first test: about 687.6 kg/m$^3$, second test: about 690.7 kg/m$^3$) than the density of the retentate samples (first test: about 701.7 kg/m$^3$, second test: about 703.8 kg/m$^3$). The density difference between the permeate and the retentate samples is an indication that diluent has been sufficiently separated into light and heavy components for enhancing oil and water phase separation of a heavy crude oil/water emulsion produced during an oil sands recovery process, while reducing or eliminating the amount of diluent that is vaporized. The wider the density difference between the permeate and the retentate, the more economical the processes described herein may be. A less dense light diluent component may enhance the production and transportation of a reduced-viscosity oil, while a more dense heavy diluent component may further reduce the risk of diluent evaporation in emulsion treatment.

TABLE 1

Compositions of the feed, retentate, and permeate products for 2 L tests (average)

| Component/Mole Fraction Description | | Initial feed sample | Permeate 1 | Permeate 2 | Retentate 1 | Retentate 2 | Calculated feed | Permeate mol frac split |
|---|---|---|---|---|---|---|---|---|
| Methane | C1 | 0.00% | 0.00% | 0.00% | 0.00% | 0.00% | 0.00% | 0.00% |
| Ethane | C2 | 0.00% | 0.00% | 0.00% | 0.00% | 0.00% | 0.00% | 0.00% |
| Propane | C3 | 0.28% | 0.10% | 0.16% | 0.12% | 0.16% | 0.14% | 49.36% |
| Iso Butane | iC4 | 1.03% | 0.69% | 0.82% | 0.75% | 0.82% | 0.77% | 50.26% |
| Normal Butane | nC4 | 4.17% | 3.23% | 3.65% | 3.39% | 3.58% | 3.46% | 50.91% |
| Iso Pentane | iC5 | 21.93% | 20.87% | 21.66% | 20.89% | 21.22% | 21.16% | 51.49% |
| Normal Pentane | nC5 | 22.58% | 22.35% | 22.79% | 21.87% | 22.05% | 22.27% | 51.93% |
| Cyclopentane | C5H10 | 2.24% | 2.33% | 2.31% | 2.30% | 2.30% | 2.31% | 51.46% |
| Hexanes | C6 | 16.74% | 17.88% | 17.59% | 17.30% | 17.13% | 17.48% | 51.99% |
| Benzene | C6H6 | 1.06% | 1.14% | 1.11% | 1.12% | 1.10% | 1.12% | 51.58% |
| Methylcyclopentane | C6H12 | 3.11% | 3.38% | 3.30% | 3.32% | 3.28% | 3.32% | 51.55% |
| Cyclohexane | C6H12 | 2.16% | 2.36% | 2.27% | 2.33% | 2.29% | 2.31% | 51.30% |
| Heptanes | C7 | 7.08% | 7.75% | 7.46% | 7.47% | 7.36% | 7.51% | 51.88% |
| Toluene | C7H8 | 1.60% | 1.79% | 1.72% | 1.71% | 1.68% | 1.73% | 52.11% |
| Methylcyclohexane | C7H14 | 2.72% | 3.02% | 2.90% | 2.96% | 2.91% | 2.95% | 51.46% |
| Octanes | C8 | 3.60% | 3.97% | 3.76% | 3.85% | 3.79% | 3.84% | 51.54% |
| Ethylbenzene | C8H10 | 1.42% | 1.58% | 1.70% | 1.52% | 1.49% | 1.57% | 53.39% |
| O-Xylene | C8H10 | 0.22% | 0.24% | 0.23% | 0.24% | 0.23% | 0.23% | 51.25% |
| Nonanes | C9 | 1.63% | 1.82% | 1.55% | 1.78% | 1.75% | 1.72% | 50.08% |
| 1,2,4 Trimethylbenzene | C9H12 | 0.25% | 0.28% | 0.26% | 0.26% | 0.26% | 0.27% | 52.19% |
| Decanes | C10 | 1.38% | 1.54% | 1.44% | 1.52% | 1.50% | 1.50% | 50.91% |
| Undecanes | C11 | 0.96% | 0.85% | 0.79% | 0.90% | 0.87% | 0.85% | 49.34% |
| Dodecanes | C12 | 0.71% | 0.66% | 0.61% | 0.73% | 0.70% | 0.67% | 48.28% |
| Tridecanes | C13 | 0.53% | 0.47% | 0.43% | 0.54% | 0.53% | 0.49% | 46.92% |
| Tetradecanes | C14 | 0.51% | 0.42% | 0.38% | 0.51% | 0.49% | 0.45% | 45.68% |
| Pentadecanes | C15 | 0.34% | 0.27% | 0.24% | 0.34% | 0.33% | 0.29% | 44.45% |
| Hexadecanes | C16 | 0.24% | 0.19% | 0.17% | 0.26% | 0.26% | 0.22% | 42.12% |
| Heptadecanes | C17 | 0.19% | 0.14% | 0.12% | 0.20% | 0.20% | 0.16% | 40.59% |
| Octadecanes | C18 | 0.18% | 0.12% | 0.11% | 0.20% | 0.19% | 0.15% | 38.27% |
| Nonadecanes | C19 | 0.14% | 0.10% | 0.09% | 0.17% | 0.16% | 0.13% | 37.71% |
| Eicosanes | C20 | 0.13% | 0.09% | 0.08% | 0.16% | 0.15% | 0.12% | 36.57% |
| Heneicosanes | C21 | 0.12% | 0.07% | 0.06% | 0.14% | 0.14% | 0.10% | 32.79% |
| Docosanes | C22 | 0.09% | 0.05% | 0.05% | 0.12% | 0.11% | 0.08% | 31.38% |
| Tricosanes | C23 | 0.07% | 0.04% | 0.03% | 0.09% | 0.09% | 0.06% | 29.01% |
| Tetracosanes | C24 | 0.07% | 0.03% | 0.03% | 0.09% | 0.08% | 0.06% | 27.07% |
| Pentacosanes | C25 | 0.06% | 0.03% | 0.02% | 0.09% | 0.09% | 0.06% | 22.59% |
| Hexacosanes | C26 | 0.05% | 0.02% | 0.02% | 0.07% | 0.07% | 0.04% | 23.09% |

TABLE 1-continued

Compositions of the feed, retentate, and permeate products for 2 L tests (average)

| Component/Mole Fraction Description | | Initial feed sample | Permeate 1 | Permeate 2 | Retentate 1 | Retentate 2 | Calculated feed | Permeate mol frac split |
|---|---|---|---|---|---|---|---|---|
| Heptacosanes | C27 | 0.05% | 0.02% | 0.02% | 0.07% | 0.07% | 0.04% | 23.09% |
| Octacosanes | C28 | 0.04% | 0.02% | 0.01% | 0.06% | 0.05% | 0.03% | 22.29% |
| Nonacosanes | C29 | 0.04% | 0.01% | 0.01% | 0.05% | 0.05% | 0.03% | 17.37% |
| Triacontanes plus | C30+ | 0.28% | 0.08% | 0.05% | 0.51% | 0.47% | 0.27% | 12.24% |
| Total | | 100.00% | 100.00% | 100.00% | 100.00% | 100.00% | 100.00% | |
| Molecular weight (g/mol) | | 94.3 | 91.7 | 91 | 97.8 | 96.7 | | |
| Density @ 15deg C. | | 692.1 | 690.7 | 687.6 | 703.8 | 701.7 | | |
| API @ 15.6deg C. | | 72.9 | 73.3 | 74.2 | 69.5 | 70.1 | | |

In the 12.5 L test, about 1,508 mL of permeate was collected at a flow rate of about 0.6 L/h and about 4,897 mL of retentate was collected at a flow rate of about 0.58 L/h. Samples of the permeate and retentate were collected once steady-state had been reached, and the samples were analyzed for their mole fraction percent compositions, which are shown in Table 2.

As described above, the calculated feed mole fraction shows some differences compared to the original feed due to light hydrocarbon losses during sample transport.

Figure 5:
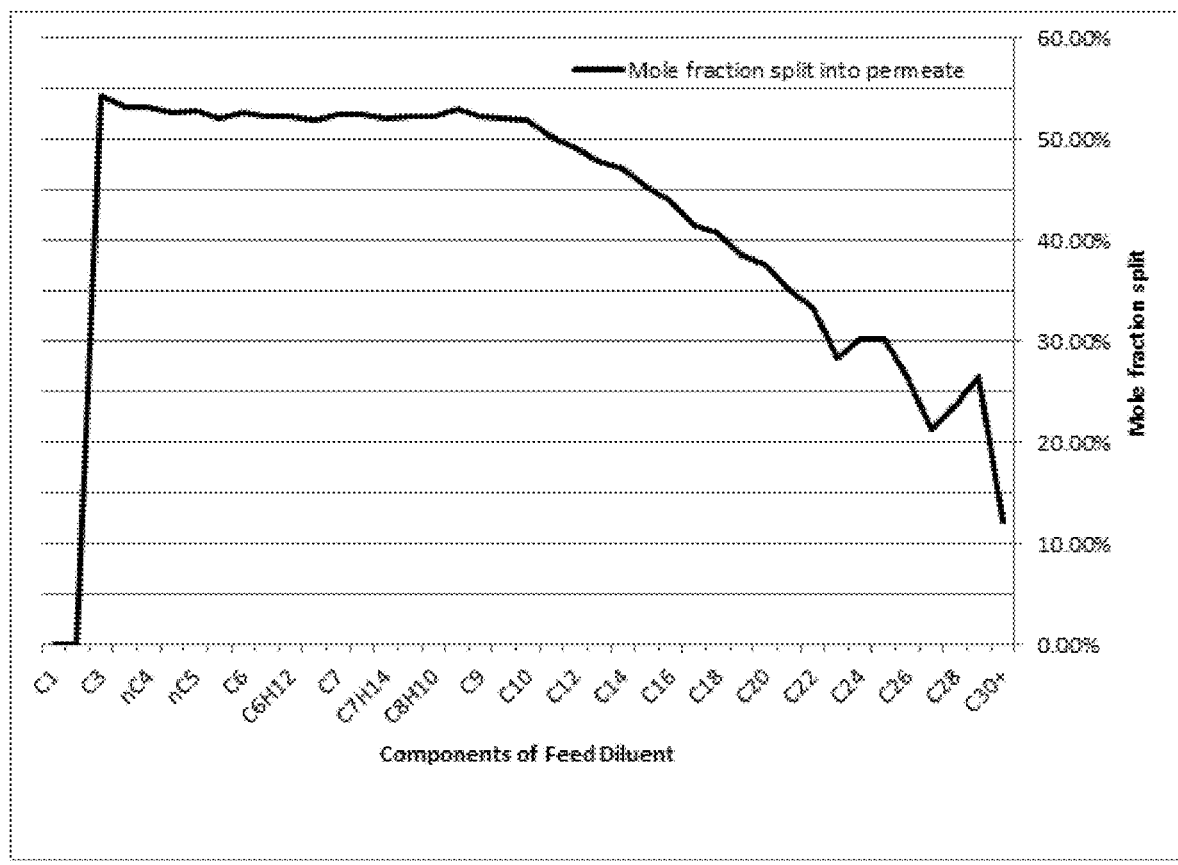
FIG. 5 is a graph illustrating the mole fraction split into permeate of each of the components in a 12.5 L feed diluent in an exemplary process according to the present disclosure.

Similar to the results from the 2 L tests, results from the 12.5 L test showed that for C3-C10 hydrocarbon components the permeate mole fraction split varied between about 52% and about 54%. From hydrocarbon C11 to larger hydrocarbons, the permeate mole fraction split decreased from about 50% (see also FIG. 5, which is a graphical representation of the permeate mole fraction split of each of the components in the feed diluent). The density of the permeate samples was lower (about 693.5 kg/m$^3$) than the density of the retentate samples (about 710.7 kg/m$^3$). Results from the 12.5 L test supported those from the 2 L test and demonstrated on a larger scale a density difference between the permeate and retentate samples. As for the 2 L test, the results of the 12.5 L test indicated that the diluent was sufficiently separated for enhancing oil and water phase separation of a heavy crude oil/water emulsion produced during an oil sands recovery process, while reducing or eliminating the amount of diluent that is vaporized. As discussed above, the wider the density difference between the permeate and the retentate, the more economical the processes described herein may be. A less dense light diluent component may enhance the production and transportation of a reduced-viscosity oil, while a more dense heavy diluent component may further reduce the risk of diluent evaporation in emulsion treatment.

TABLE 2

Compositions of the feed, retentate, and permeate products for 12.5 L test

| Component/Mole Fraction Description | | Initial sample 1 | Permeate | Retentate | Calculated feed | Permeate mol frac split |
|---|---|---|---|---|---|---|
| Methane | C1 | 0.00% | 0.00% | 0.00% | 0.00% | 0.00% |
| Ethane | C2 | 0.00% | 0.00% | 0.00% | 0.00% | 0.00% |
| Propane | C3 | 0.28% | 0.12% | 0.11% | 0.12% | 54.22% |
| Iso Butane | iC4 | 1.03% | 0.67% | 0.64% | 0.66% | 53.20% |
| Normal Butane | nC4 | 4.17% | 3.07% | 2.94% | 3.01% | 53.14% |
| Iso Pentane | iC5 | 21.93% | 19.90% | 19.43% | 19.67% | 52.65% |
| Normal Pentane | nC5 | 22.58% | 21.53% | 20.90% | 21.23% | 52.80% |
| Cyclopentane | C5H10 | 2.24% | 2.32% | 2.32% | 2.32% | 52.06% |
| Hexanes | C6 | 16.74% | 18.09% | 17.72% | 17.91% | 52.57% |
| Benzene | C6H6 | 1.06% | 1.16% | 1.15% | 1.16% | 52.27% |
| Methylcyclopentane | C6H12 | 3.11% | 3.48% | 3.45% | 3.47% | 52.27% |
| Cyclohexane | C6H12 | 2.16% | 2.43% | 2.45% | 2.44% | 51.85% |
| Heptanes | C7 | 7.08% | 8.13% | 7.97% | 8.05% | 52.55% |
| Toluene | C7H8 | 1.60% | 1.88% | 1.85% | 1.87% | 52.46% |
| Methylcyclohexane | C7H14 | 2.72% | 3.18% | 3.18% | 3.18% | 52.06% |
| Octanes | C8 | 3.60% | 4.21% | 4.17% | 4.19% | 52.30% |
| Ethylbenzene | C8H10 | 1.42% | 1.68% | 1.66% | 1.67% | 52.36% |
| O-Xylene | C8H10 | 0.22% | 0.26% | 0.25% | 0.26% | 53.04% |
| Nonanes | C9 | 1.63% | 1.95% | 1.93% | 1.94% | 52.32% |
| 1,2,4 Trimethylbenzene | C9H12 | 0.25% | 0.29% | 0.29% | 0.29% | 52.06% |
| Decanes | C10 | 1.38% | 1.64% | 1.65% | 1.64% | 51.91% |
| Undecanes | C11 | 0.96% | 0.91% | 0.98% | 0.94% | 50.21% |
| Dodecanes | C12 | 0.71% | 0.71% | 0.80% | 0.75% | 49.08% |
| Tridecanes | C13 | 0.53% | 0.50% | 0.59% | 0.54% | 47.92% |
| Tetradecanes | C14 | 0.51% | 0.46% | 0.56% | 0.51% | 47.14% |
| Pentadecanes | C15 | 0.34% | 0.29% | 0.38% | 0.33% | 45.32% |
| Hexadecanes | C16 | 0.24% | 0.21% | 0.29% | 0.25% | 44.02% |
| Heptadecanes | C17 | 0.19% | 0.15% | 0.23% | 0.19% | 41.46% |
| Octadecanes | C18 | 0.18% | 0.14% | 0.22% | 0.18% | 40.86% |
| Nonadecanes | C19 | 0.14% | 0.11% | 0.19% | 0.15% | 38.60% |
| Eicosanes | C20 | 0.13% | 0.10% | 0.13% | 0.14% | 37.63% |
| Heneicosanes | C21 | 0.12% | 0.08% | 0.16% | 0.12% | 35.19% |
| Docosanes | C22 | 0.09% | 0.06% | 0.13% | 0.09% | 33.38% |

TABLE 2-continued

Compositions of the feed, retentate, and permeate products for 12.5 L test

| Component/Mole Fraction Description | | Initial sample 1 | Permeate | Retentate | Calculated feed | Permeate mol frac split |
|---|---|---|---|---|---|---|
| Tricosanes | C23 | 0.07% | 0.04% | 0.11% | 0.07% | 28.31% |
| Tetracosanes | C24 | 0.07% | 0.04% | 0.10% | 0.07% | 30.28% |
| Pentatosanes | C25 | 0.06% | 0.04% | 0.10% | 0.07% | 30.28% |
| Hexacosanes | C26 | 0.05% | 0.03% | 0.09% | 0.06% | 26.58% |
| Heptacosanes | C27 | 0.05% | 0.02% | 0.08% | 0.05% | 21.35% |
| Octacosanes | C28 | 0.04% | 0.02% | 0.07% | 0.04% | 23.68% |
| Nonacosanes | C29 | 0.04% | 0.02% | 0.06% | 0.04% | 25.58% |
| Triacontanes plus | C30+ | 0.28% | 0.08% | 0.62% | 0.34% | 12.29% |
| Total | | 100.00% | 100.00% | 100.00% | 100.00% | |
| Molecular weight (g/mol) | | 94.3 | 93.3 | 100.6 | | |
| Density @ 15deg C. | | 692.1 | 693.5 | 710.7 | | |
| API @ 15.6deg C. | | 72.9 | 72.5 | 67.5 | | |

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. A process for treating a feed diluent that includes a light hydrocarbon component and a heavy hydrocarbon component to enrich the relative amount of the heavy hydrocarbon component in a retentate product, the process comprising:
    applying the feed diluent to a feed side of an organic solvent nanofiltration membrane;
    causing the light hydrocarbon component in the feed diluent to preferentially pass through the membrane in comparison to the heavy hydrocarbon component in the feed diluent; and
    producing the retentate product that is enriched in the heavy hydrocarbon component in comparison to the heavy hydrocarbon component in the feed diluent.

2. The process of claim 1, wherein the feed diluent is a mixture of liquid hydrocarbons that, in combination, have a density of less than 800 kg/m$^3$.

3. The process of claim 1, wherein the feed diluent comprises a natural-gas condensate.

4. The process of claim 1, wherein the light hydrocarbon component comprises hydrocarbons with a calculated permeate mole fraction split of greater than or equal to about 50%.

5. The process of claim 1, wherein the heavy hydrocarbon component comprises hydrocarbons with a calculated permeate mole fraction split of less than about 50%.

6. The process of claim 4, wherein the light hydrocarbon component comprises one or more C3 to C6 alkane or aromatic hydrocarbons.

7. The process of claim 1, wherein causing the light hydrocarbon component to preferentially pass through the membrane comprises:
    applying the feed diluent to the feed side of the organic solvent nanofiltration membrane at a flux from about 1,000 L/h/m$^2$ to about 20,000 L/h/m$^2$, with a permeate:retentate volume split ratio of about 1:1, at a pressure of about 30 bar.

8. The process of claim 1, wherein the membrane is conditioned with a membrane conditioning fluid prior to applying the feed diluent to the feed side of the organic solvent filtration membrane.

9. The process of claim 8, wherein the membrane conditioning fluid is a non-polar solvent.

10. A process comprising:
    treating a feed diluent according to the process of claim 1 to produce a retentate product that is enriched in the heavy hydrocarbon component in comparison to the heavy hydrocarbon component in the feed diluent; and
    mixing at least a portion of a permeate product that is enriched in the light hydrocarbon component with a heavy crude oil to generate a reduced-viscosity oil.

11. The process of claim 10, wherein:
    a sufficient amount of the permeate product is mixed with the heavy crude oil to result in the reduced-viscosity oil having a viscosity of about 350 cSt, and further comprising:
    transporting the reduced-viscosity oil through a pipeline.

12. The process of claim 10, wherein:
    a sufficient amount of the permeate product is mixed with the heavy crude oil to result in the reduced-viscosity oil having a viscosity of between about 350 cSt and about 500,000 cSt, and further comprising:
    transporting the reduced-viscosity oil by rail.

13. A process according to claim 1, further comprising:
    mixing at least a portion of the retentate product that is enriched in the heavy hydrocarbon component with an emulsion that comprises heavy crude oil and produced water; and
    separating at least a portion of the heavy crude oil from at least a portion of the produced water.

14. The process according to claim 13, wherein a sufficient amount of the retentate product is mixed with the emulsion to result in a mixture of about 30% water and about 70% heavy crude oil.

15. The process according to claim 13, wherein the separated heavy crude oil comprises less than about 0.5% basic sediment and water (BS&W) and the separated produced water comprises less than about 1,000 ppm oil and grease.

16. The process according to claim 13, further comprising:
   producing a permeate product that is enriched in the light hydrocarbon component in comparison to the light hydrocarbon component in the feed diluent; and
   mixing at least a portion of the permeate product with the separated heavy crude oil to generate a reduced-viscosity oil.

17. The process of claim 16, wherein:
   a sufficient amount of the permeate product is mixed with the separated heavy crude oil to result in the reduced-viscosity oil having a viscosity of about 350 cSt, and further comprising:
   transporting the reduced-viscosity oil through a pipeline.

18. The process of claim 16, wherein:
   a sufficient amount of the permeate product is mixed with the separated heavy crude oil to result in the reduced-viscosity oil having a viscosity of between about 350 cSt and about 500,000 cSt, and further comprising:
   transporting the reduced-viscosity oil by rail.

19. A system for treating a feed diluent that includes a light hydrocarbon component and a heavy hydrocarbon component to increase the relative amount of the heavy hydrocarbon component in a retentate product, the system comprising:
   a feed line for the feed diluent;
   a filtration chamber separated into a retentate side and a permeate side by an organic solvent nanofiltration membrane positioned within the filtration chamber;
   wherein the filtration chamber is in fluid communication with the feed line and the diluent is provided to the retentate side of the filtration chamber;
   wherein the organic solvent nanofiltration membrane preferentially retains the heavy hydrocarbon component and produces the retentate product that is enriched in the heavy hydrocarbon component in comparison to the heavy hydrocarbon component in the feed diluent.

20. The process of claim 11, further comprising: separating at least a portion of the permeate product from the reduced-viscosity oil.

21. The process of claim 12, further comprising: separating at least a portion of the permeate product from the reduced-viscosity oil.

22. The process of claim 17, further comprising: separating at least a portion of the permeate product from the reduced-viscosity oil.

23. The process of claim 18, further comprising: separating at least a portion of the permeate product from the reduced-viscosity oil.

* * * * *